United States Patent
Wu et al.

(10) Patent No.: US 9,728,795 B2
(45) Date of Patent: Aug. 8, 2017

(54) COMPLEX FUEL CELL STACK WITH HYDROGEN STORAGE UNIT

(71) Applicant: NATIONAL CHUNG SHAN INSTITUTE OF SCIENCE AND TECHNOLOGY, Longtan Township (TW)

(72) Inventors: Yuan-Pang Wu, Longtan Township (TW); Po-Han Chu, Longtan Township (TW); Tao-Wen Pao, Longtan Township (TW); Hui-Yun Bor, Longtan Township (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 351 days.

(21) Appl. No.: 14/578,741

(22) Filed: Dec. 22, 2014

(65) Prior Publication Data
US 2016/0181633 A1    Jun. 23, 2016

(51) Int. Cl.
*H01M 8/04* (2016.01)
*H01M 8/04082* (2016.01)
*H01M 8/2465* (2016.01)
*H01M 8/04007* (2016.01)
*H01M 8/04089* (2016.01)
*H01M 8/1018* (2016.01)

(52) U.S. Cl.
CPC ... *H01M 8/04201* (2013.01); *H01M 8/04067* (2013.01); *H01M 8/04089* (2013.01); *H01M 8/04216* (2013.01); *H01M 8/2465* (2013.01); *H01M 2008/1095* (2013.01)

(58) Field of Classification Search
CPC .................................................. H01M 8/04201
USPC ........................................................ 429/465
See application file for complete search history.

(56) References Cited

U.S. PATENT DOCUMENTS

| 2008/0079386 A1* | 4/2008 | Kabumoto ........ H01M 8/04186 320/101 |
| 2011/0223514 A1* | 9/2011 | Blanchet ............. H01M 8/0232 429/465 |

* cited by examiner

*Primary Examiner* — Basia Ridley
*Assistant Examiner* — James Erwin
(74) *Attorney, Agent, or Firm* — Schmeiser, Olsen & Watts, LLP

(57) ABSTRACT

A complex fuel cell stack with hydrogen storage unit is introduced. Through the new configuration of the PEM fuel cell stack, no cooling system and cooling fluid is needed for the fuel cell stack, since hydrogen storage vessel can act as a heat sink to protect the expensive catalyst layer of the MEA of the fuel cell away from over-heated and damaged. In addition, the waste heat generated from the operation of the fuel cells can aid in release of hydrogen from hydrogen storage alloys inside the hydrogen storage vessel.

4 Claims, 1 Drawing Sheet

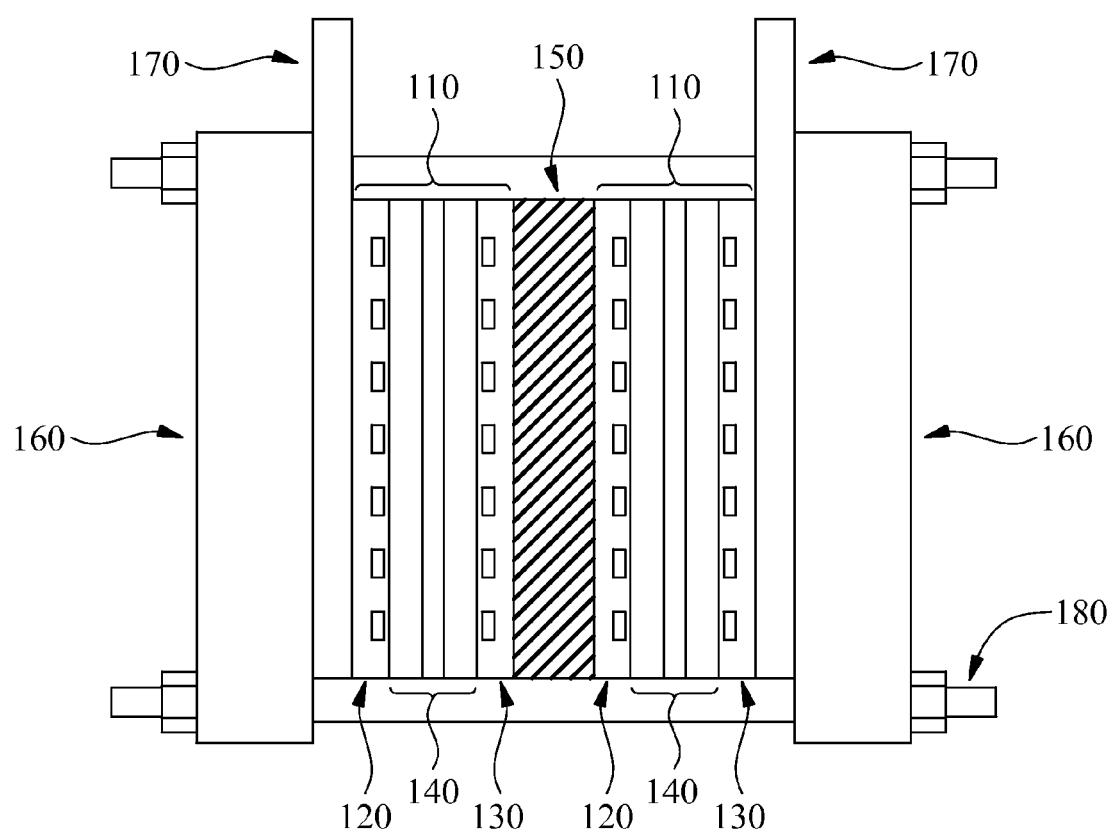

COMPLEX FUEL CELL STACK WITH HYDROGEN STORAGE UNIT

FIELD OF TECHNOLOGY

The present invention generally relates to the new configuration of the fuel cell stack. More particularly, the present invention relates to a heat exchange from individual cells to hydrogen storage vessels, which act as heat sink of the membrane-electrode assembly (MEA). In this particular configuration, heat generates from individual cells can be absorbed by the hydrogen storage alloys inside the hydrogen storage vessels. This can aid in releasing the hydrogen from the hydrogen storage alloy, resulting in a readily available stream of hydrogen being supplied from the hydrogen storage vessel.

BACKGROUND

The former US President Bush stated in 2003 that "with a new national commitment, our scientists and engineers will overcome obstacles to taking these cars from laboratory to showroom, so that the first car driven by a child born today could be powered by hydrogen and pollution free". Not only were the American scientists inspired by President Bush's speech, many other scientists of the whole world also devoted themselves to this research. With hydrogen now being a viable source to power vehicles, considerable research has been performed on designing internal combustion engines to run on hydrogen rather than fossil fuels. In these designs, a hydrogen/air mixture is combusted inside an internal combustion engine much like gasoline and other hydrocarbon fuels are combusted in present day internal combustion engines. With hydrogen, however, catalytic converters are not needed to treat the exhaust to comply with emission standards. Hydrogen burns clean with the only byproduct being water.

On the other hand, considerable research has also been performed on using fuel cells to power vehicles. Fuel cells, like batteries, operate by utilizing electrochemical reactions. Unlike a battery, in which chemical energy is stored within the cell, fuel cells generally are supplied with reactants from outside the cell to produce an electrical current used to power a vehicle. In fuel cells, a hydrogen stream, an oxygen stream, and an electrolyte stream are used to provide an electric current. Fuel cells offer a number of important advantages over internal combustion engine or generator systems. These include relatively high efficiency, environmentally clean operation, high reliability, few moving parts, and quiet operation. Fuel cells potentially are more efficient than other conventional power sources based upon the Carnot cycle.

Among many types of fuel cells, PEM fuel cell has drawn the most attention because of its simplicity, viability, quick start-up, and it has been demonstrated in almost any conceivable application, from powering a cell phone to a locomotive. PEM stands for Polymer Electrolyte Membrane or Proton Exchange Membrane. In early 1960's, these cells were known as Solid Polymer Electrolyte fuel cells as an auxiliary power source in the Gemini space flights.

While hydrogen has wide potential application as a fuel, a major drawback in its utilization, especially in limited space or mobile uses such as the powering of vehicles, has been the lack of acceptable lightweight compact hydrogen storage medium. Conventionally, hydrogen has been stored in pressure-resistant vessels under a high pressure or stored as a cryogenic liquid, being cooled to an extremely low temperature. Storage of hydrogen as a compressed gas of liquid involves the use of large and/or cryogenic vessels, making the use of hydrogen to power vehicles less feasible.

Fortunately, storing hydrogen in its affinitive alloys (also named hydrogen storage alloys) is safe and efficient when compared to the method of pressurizing hydrogen gas into high-strength alloy container. The same amount of hydrogen when absorbed in alloy occupies only one thousandth of the volume compared to when it is in a gas state at one atmosphere. Regarding safety, if hydrogen leaks from the hydrogen storage alloy accidentally, further release rates will decrease as a result of the drop of temperature. So, hydrogen storage alloys have long been commercially used in hybrid cars and the electrode of Ni—H batteries for 3C electronic products. The more recent appeal of these alloys is in their potential application in fuel cell energy. The use of a hydrogen storage alloy is one of the ideal methods for hydrogen storage and transportation, because the volume density of hydrogen is high or even higher than that of liquid or solid hydrogen.

SUMMARY

The present invention discloses a new configuration of the fuel cell stack with hydrogen storage unit, where the total space and weight of the fuel cell stack and the hydrogen storage unit are greatly reduced. In this particular configuration, the hydrogen storage unit including a hydrogen storage vessel at least partially filled with a hydrogen storage alloy. This vessel replaces the cooling plate, and is inserted into the cooling section between two adjacent single cells.

In the new configuration of the fuel cell stack, the hydrogen storage vessel supports two adjacent cells. Except to supply hydrogen fuel to the cells, as usual, the hydrogen storage vessels have, therefore, three new functions: (1) to absorb the heat generated from the cell, (2) to separate the individual cells in the stack, and (3) to carry current away from the cell.

During operation of the fuel cell, the waste heat generates from individual cells can be absorbed by the hydrogen storage alloys inside the hydrogen storage vessels. The materials of the hydrogen storage vessel should be thermally conductive, like metal, which can facilitate fast heat transfer. Adding heat to the hydrogen storage alloy also aids in releasing the hydrogen from the hydrogen storage alloy, resulting in a readily available stream of hydrogen being supplied from the hydrogen storage vessel.

BRIEF DESCRIPTION

FIG. 1 shows a schematic diagram of fuel cells stack configuration of the present invention.

DETAILED DESCRIPTION

The present invention discloses a new configuration of the fuel cell stack with hydrogen storage unit including at least two individual cells 110, at least four bolts 180, at least one hydrogen storage vessel 150, two current collectors 170, two end plates 160, and other hardware (springs, intake/exhaust pipes and fittings, etc, not shown in FIG. 1). The individual cell 110, may further divided into three components: a membrane-electrode assembly (MEA) 140, the anode field flow plates 120, and the cathode field flow plates 130. The MEA 140, which is at the heart of a single PEM fuel cell, consists of a membrane, two dispersed catalyst layers, and two gas diffusion layers. The anode field flow plates 120 and the cathode field flow plates 130 are also named graphite plates as their materials. Gas channels are on the surfaces of graphite plates to facilitate hydrogen and oxygen gas distribute within the cell. The hydrogen storage vessel 150 is then sandwiched by two graphite plates.

During operation of the fuel cell, hydrogen fuel is channeled through anode field flow plates 120 to the anode on one side of the fuel cell, while oxygen from the air is channeled through cathode field flow plates 130 to the cathode on the other side of the single cell 110. At the anode, a platinum catalyst causes the hydrogen to split into its primary constituents—protons and electrons, since each hydrogen atom consists of one electron and one proton. The Polymer Electrolyte Membrane (PEM) allows only the positively charged ions to pass through it to the cathode. The negatively charged electrons, therefore collected at one of the current collectors 170, must travel along an external circuit to the cathode, creating an electrical current. At the cathode, the electrons and positively charged hydrogen ions combine with oxygen, which is supplied from the cathode field flow plates 130, to form water, which flows out of the cell 110. The heat generates at the time when water is formed can quickly be absorbed by the adjacent hydrogen storage vessels 150. Since the plateau pressure of the hydrogen storage alloys is a function of temperature in log-scale, a slightly change in temperature will very helpful increase the supply pressure of hydrogen. This results in a readily available stream of hydrogen being supplied from the hydrogen storage vessel.

A pressure regulator may also be included to regulate the pressure of the exiting hydrogen stream as needed. The hydrogen storage vessels 150 may be pressure containment vessels at least partially filled with a hydrogen storage alloy. The interior of the vessels may also be divided into compartments by thermally conductive materials to The alloys used within the metal hydride hydrogen storage unit may be any of those known in art for such purposes. Specific alloys include AB5, AB2 AB or BCC phase alloys, such as rare earth-nickel alloys, titanium—zirconium alloys, titanium—iron alloys, vanadium-based alloys, Ti—V—Cr based solid solution alloys, magnesium alloys, and the like.

Although we illustrate only two cells in FIG. 1, more than two individual cells can be combined into a fuel cell stack in the same way to obtain desired power. Therefore, the foregoing description is only a preferred embodiment of the present invention. Those equivalent changes or modifications made according to the shape, structure, feature, or spirit described in the claims of the present invention is included in the appended claims of the present invention.

What is claimed is:

1. A complex PEM fuel cell stack with hydrogen storage unit, comprising:
- at least three single cells;
- at least two hydrogen storage vessels, which are located in between two single cells, and at least one single cell is located in between two hydrogen storage vessels;
- two current collectors; and
- two end plates.

2. The complex PEM fuel cell stack with hydrogen storage unit according to claim 1, wherein the two hydrogen storage vessels at least partially filled with a hydrogen storage alloy.

3. A complex PEM fuel cell stack with hydrogen storage unit, comprising:
- at least three MEAs (membrane electrode assembly);
- at least six graphite plates;
- at least two hydrogen storage vessels, which are located in between two graphite plates, and at least one of the at least three MEAs is located in between two hydrogen storage vessels;
- two current collectors; and
- two end plates.

4. The complex PEM fuel cell stack with hydrogen storage unit according to claim 3, wherein the two hydrogen storage vessels at least partially filled with a hydrogen storage alloy.

* * * * *